United States Patent
Kitazawa et al.

(10) Patent No.: US 12,466,310 B2
(45) Date of Patent: Nov. 11, 2025

(54) DISPLAY DEVICE FOR VEHICLE

(71) Applicant: KOITO MANUFACTURING CO., LTD., Tokyo (JP)

(72) Inventors: Yukiko Kitazawa, Shizuoka (JP); Yuichi Shibata, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/575,599

(22) PCT Filed: Jul. 22, 2022

(86) PCT No.: PCT/JP2022/028467
§ 371 (c)(1),
(2) Date: Dec. 29, 2023

(87) PCT Pub. No.: WO2023/013442
PCT Pub. Date: Feb. 9, 2023

(65) Prior Publication Data
US 2024/0308422 A1    Sep. 19, 2024

(30) Foreign Application Priority Data
Aug. 2, 2021  (JP) .................................. 2021-126366

(51) Int. Cl.
*B60Q 1/50* (2006.01)
*B60R 1/22* (2022.01)
(Continued)

(52) U.S. Cl.
CPC .................. *B60Q 1/50* (2013.01); *B60R 1/22* (2022.01); *B60R 11/04* (2013.01); *F21S 43/26231* (2024.05); *F21W 2103/60* (2018.01)

(58) Field of Classification Search
None
See application file for complete search history.

(56) References Cited

U.S. PATENT DOCUMENTS

| 12,083,957 B2 | 9/2024 | Shibata et al. |
| 2013/0010484 A1* | 1/2013 | Son .................. B60Q 1/346 |
| | | 362/464 |

(Continued)

FOREIGN PATENT DOCUMENTS

| DE | 102017222816 A1 | 6/2019 |
| EP | 3835128 A1 | 6/2021 |

(Continued)

OTHER PUBLICATIONS

International Search Report dated Aug. 30, 2022 filed in PCT/JP2022/028467.

(Continued)

*Primary Examiner* — Rebecca A Volentine
(74) *Attorney, Agent, or Firm* — Rankin, Hill & Clark LLP (57) ABSTRACT

A display device includes a projection device RP that projects a notification pattern on a region in the vicinity of a vehicle CAR, an imaging device RC that images the region in the vicinity of the vehicle, and an object detection device OS capable of detecting an object (third party) present in a region which cannot be imaged by the imaging device RC. When the object detection device OS detects the object, the projection device RP projects the notification pattern in a form different from the notification in a normal state, so that the third party can visually recognize the notification pattern. The imaging device RC images a region including a region on which the notification pattern is projected, and displays, on a monitor MO visually checkable by the occupant, a captured image of the notification pattern projected in the form different from the notification pattern in the normal state.

11 Claims, 12 Drawing Sheets

(51) Int. Cl.
  *B60R 11/04* (2006.01)
  *F21S 43/20* (2018.01)
  *F21W 103/60* (2018.01)

(56) References Cited

U.S. PATENT DOCUMENTS

| | | | |
|---|---|---|---|
| 2017/0203685 A1* | 7/2017 | Hirai | B60Q 1/0023 |
| 2017/0259728 A1 | 9/2017 | Yoshida et al. | |
| 2019/0113197 A1* | 4/2019 | Kamiya | F21S 43/14 |
| 2019/0217780 A1 | 7/2019 | Yamaguchi | |
| 2021/0162927 A1 | 6/2021 | Takii et al. | |
| 2021/0188159 A1* | 6/2021 | Fukutaka | B60Q 1/46 |
| 2021/0206312 A1 | 7/2021 | Mochizuki et al. | |
| 2021/0347259 A1 | 11/2021 | Shibata et al. | |
| 2022/0219599 A1 | 7/2022 | Mochizuki et al. | |

FOREIGN PATENT DOCUMENTS

| | | |
|---|---|---|
| JP | 2005-329819 A | 12/2005 |
| JP | 2008-007079 A | 1/2008 |
| JP | 2008-009941 A | 1/2008 |
| JP | 2017149398 A | 8/2017 |
| JP | 2017-159871 A | 9/2017 |
| JP | 2019125920 A | 7/2019 |
| JP | 2020-055519 A | 4/2020 |
| WO | 2011013813 A1 | 2/2011 |
| WO | 2020/067113 A1 | 4/2020 |
| WO | 2021006217 A1 | 1/2021 |

OTHER PUBLICATIONS

EESR issued on Sep. 25, 2024 for the corresponding European Patent Application No. 22852866.7.

Japanese Office Action (JPOA) mailed on Sep. 2, 2025 for Japanese Patent Application No. 2021-126366 and its English machine translation.

* cited by examiner

DISPLAY DEVICE FOR VEHICLE

TECHNICAL FIELD

The present invention relates to a display device suitable for application to a vehicle, for example, an automobile, and more particularly to a vehicle display device, which includes a projection device that projects a notification pattern for notifying the behavior of a subject vehicle on a region including, e.g., a road surface in the vicinity of the subject vehicle.

BACKGROUND ART

For the purpose of ensuring traffic safety, there has been proposed a display device for notifying a third party, such as a pedestrian or other vehicles, of the behavior of an automobile, for example, a traveling or stop state or a traveling direction. Patent Literature 1 is a technique in which a display device including, e.g., a projector is mounted on an automobile and a notification pattern including a required design is projected on a road surface in front or rear of a subject vehicle by the projector. When a third party visually recognizes this notification pattern, the third party can recognize the behavior of the automobile and avoid contact with the automobile in advance.

For recent automobiles, as in Patent Literature 2, there has also been proposed a technique in which an imager such as a camera that images a region which is a blind area of a driver is mounted and an image captured by the camera is displayed on a monitor. By visually checking the image on the monitor, the driver can recognize a third party present in the blind area, and can safely move the subject vehicle to suitable direction and position.

CITATION LIST

Patent Literature

Patent Literature 1: JP-A-2020-55519
Patent Literature 2: JP-A-2019-125920

SUMMARY OF INVENTION

Problems to be Solved by Invention

An imaging region of the camera and a region where a captured image is displayed on a monitor are limited, and in particular, regions diagonally on the rear left and right sides of an automobile have an unconfirmed region which is a blind area which cannot be checked on the monitor. In particular, it is difficult to check, on the monitor, a child, a person who has crouched, etc. In the technique of Patent Literature 1, the third party can perceive danger of the third party oneself and take action to avoid the danger by visually recognizing the notification pattern, but on the other hand, a driver cannot recognize the presence of the third party and cannot perform driving to avoid the danger in some cases.

In addition, if the notification pattern is merely projected, the third party may not notice the notification pattern. In particular, it is difficult for a child who is difficult to be imaged by a camera or a person who has crouched to notice the notification pattern. On the other hand, even in a case where the third party visually recognizes the notification pattern, it may not be possible to accurately understand the behavior of the automobile intended by the notification pattern, and for example, it may be difficult for the third party to understand the degree of urgency of the danger to the third party oneself.

An object of the present invention is to provide a display device that enables a third party to reliably recognize a projected notification pattern and enables safe traveling of a vehicle. Another object of the present invention is to provide a display device that enables an occupant of the vehicle to recognize the third party based on the notification pattern, thereby enabling further safe traveling of the vehicle.

Solution to Problems

A vehicle display device according to the present invention includes a projection device that projects a notification pattern on a region in the vicinity of a vehicle, an imaging device that images the region in the vicinity of the vehicle, and an object detection device capable of detecting an object present in a region which cannot be imaged by the imaging device, and when the object detection device detects the object, the projection device projects the notification pattern in a form different from the notification pattern in a normal state. The imaging device is capable of imaging a region including at least a region on which the notification pattern is projected, and the captured image is displayed on a monitor visually checkable by an occupant of the vehicle.

Preferably in the present invention, the notification pattern includes a first notification pattern and a second notification pattern that correspond to different movement modes of the vehicle, and at least one of a pattern shape or color is different between the first notification pattern and the second notification pattern. For example, at least one of the first notification pattern or the second notification pattern is projected in a blinking state when the object detection device detects the object. Alternatively, a projection position or a projection direction of at least one of the first notification pattern and the second notification pattern is changed when the object detection device detects the object.

Preferably in the present invention, the projection device includes a first projection device that projects the first notification pattern and a second projection device that projects the second notification pattern. In this case, the first projection device and the second projection device are installed in a lamp housing of the vehicle. Alternatively, the first projection device and the second projection device are installed in one casing.

Effects of Invention

According to the present invention, when the object present in the region which cannot be imaged by the imaging device is detected, the projection form of the notification pattern by the projection device is controlled, thereby enabling a third party who has visually recognized the notification pattern to recognize the behavior of the vehicle and further enabling a driver to recognize the presence of the third party based on the notification pattern. This enables safe traveling of the vehicle.

DESCRIPTION OF EMBODIMENTS

First Embodiment

Figure 1:
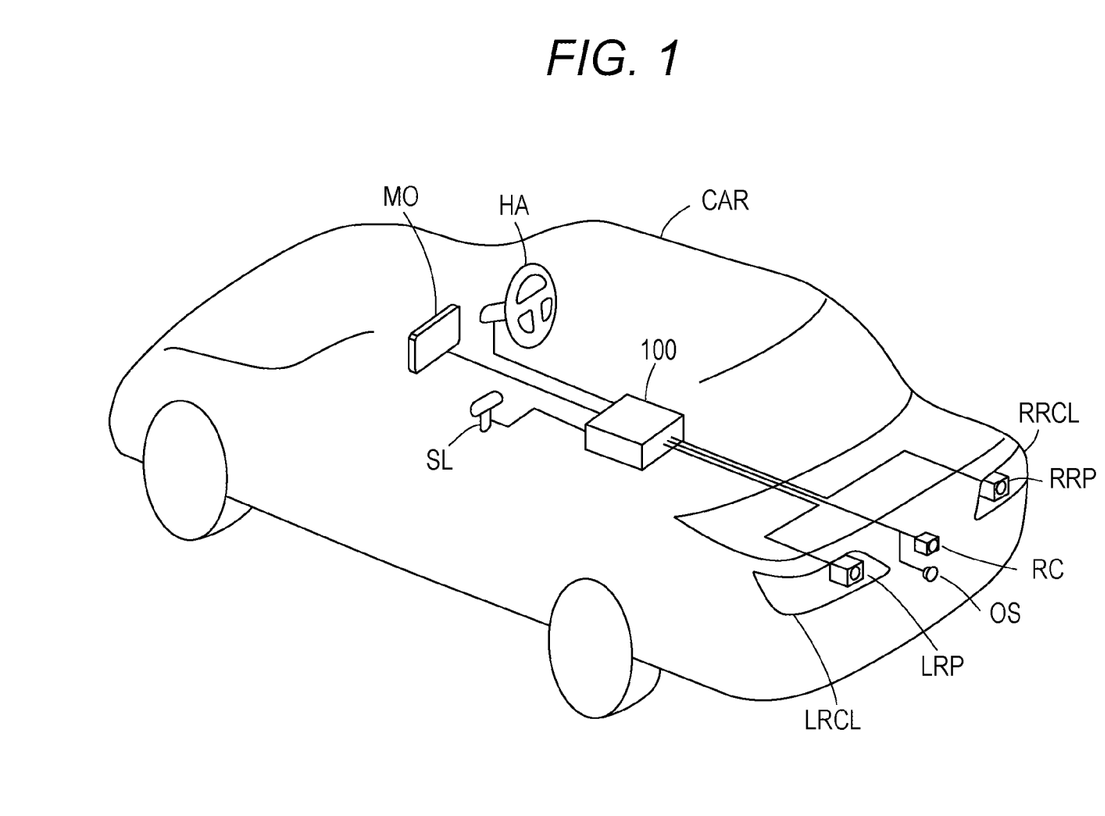
FIG. 1 is a schematic perspective view of an automobile equipped with a display device of a first embodiment.

Next, embodiments of the present invention will be described with reference to the drawings. FIG. 1 is a schematic perspective view of an automobile CAR equipped with a display device of a first embodiment of the present invention. A left rear combination lamp LRCL and a right rear combination lamp RRCL are each arranged on the left and right of a vehicle body rear portion of the automobile CAR. Although not illustrated, a tail lamp, a backup lamp, and a turn signal lamp are incorporated in a lamp housing of each of the left and right rear combination lamps LRCL, RRCL.

A left rear projector LRP is arranged inside the left rear combination lamp LRCL in a vehicle width direction, and a right rear projector RRP is arranged inside the right rear combination lamp RRCL in the vehicle width direction. The left and right rear projectors LRP, RRP are each configured as a first projection device and a second projection device that project a notification pattern CP (see FIG. 4) having a required design on a road surface in rear of the automobile CAR.

Figure 2:
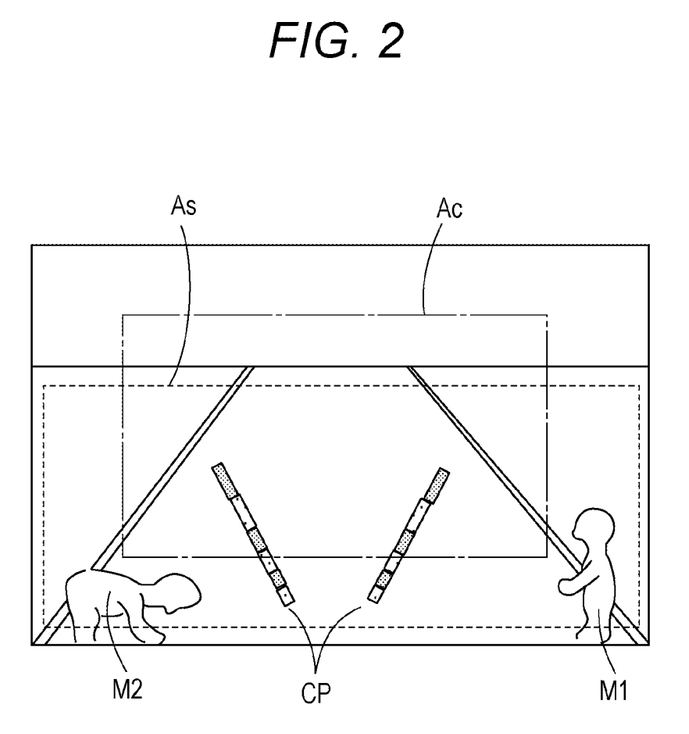
FIG. 2 is a view illustrating an imaging region of a rear camera and a detection region of an object sensor.

A rear camera (back camera) RC as an imaging device is arranged in part of a trunk lid of the vehicle body rear portion of the automobile CAR, and as illustrated in FIG. 2, images a region in rear of the automobile CAR, particularly a region Ac including a road surface in rear of the automobile CAR. Since an existing camera using a semiconductor imaging element can be used as the rear camera RC, detailed description of the rear camera is omitted here. Further, the rear camera RC may be arranged at a position facing a rear window of the automobile CAR or a position in the vicinity of a license plate.

In addition, an object sensor OS that detects an object, particularly a human, present in the region in rear of the automobile is arranged in part of a rear bumper of the automobile CAR. The object sensor OS includes, for example, an infrared sensor. Detailed description of the infrared sensor will be omitted. As illustrated in FIG. 2, a rear region As targeted for detection by the object sensor OS is set particularly as a region wider in the left-right direction in rear of the automobile CAR, unlike the imaging region Ac of the rear camera RC. This region As includes a region which is a so-called blind area of the automobile CAR.

On the other hand, as illustrated in FIG. 1, a monitor MO is arranged at a position facing a driver's seat on a dashboard in a vehicle interior of the automobile CAR, and is configured such that a driver can visually recognize an image displayed on a display screen of the monitor MO. The monitor MO is connected to an electronic control unit (ECU) 100 together with the left and right rear projectors LRP, RRP, the rear camera RC, and the object sensor OS. The ECU 100 is capable of displaying an image captured by the rear camera RC on the display screen of the monitor MO and controlling the notification pattern CP projected by the left and right rear projectors LRP, RRP. In addition, the ECU 100 is capable of controlling the projection form of the notification pattern CP when an object is detected by the object sensor OS.

Driving information indicating the driving state of the automobile CAR is input to the ECU 100. Here, the ECU 100 is connected to a shift lever SL and a steering wheel HA to be operated by the driver when the automobile moves backward, and backward movement information as the driving information is input from the shift lever SL and steering information is input from the steering wheel HA. Note that the ECU 100 may be a vehicle ECU that controls the entirety of the automobile, a lamp ECU that controls a lamp of the automobile, or an ECU that independently controls other components.

Figure 3:
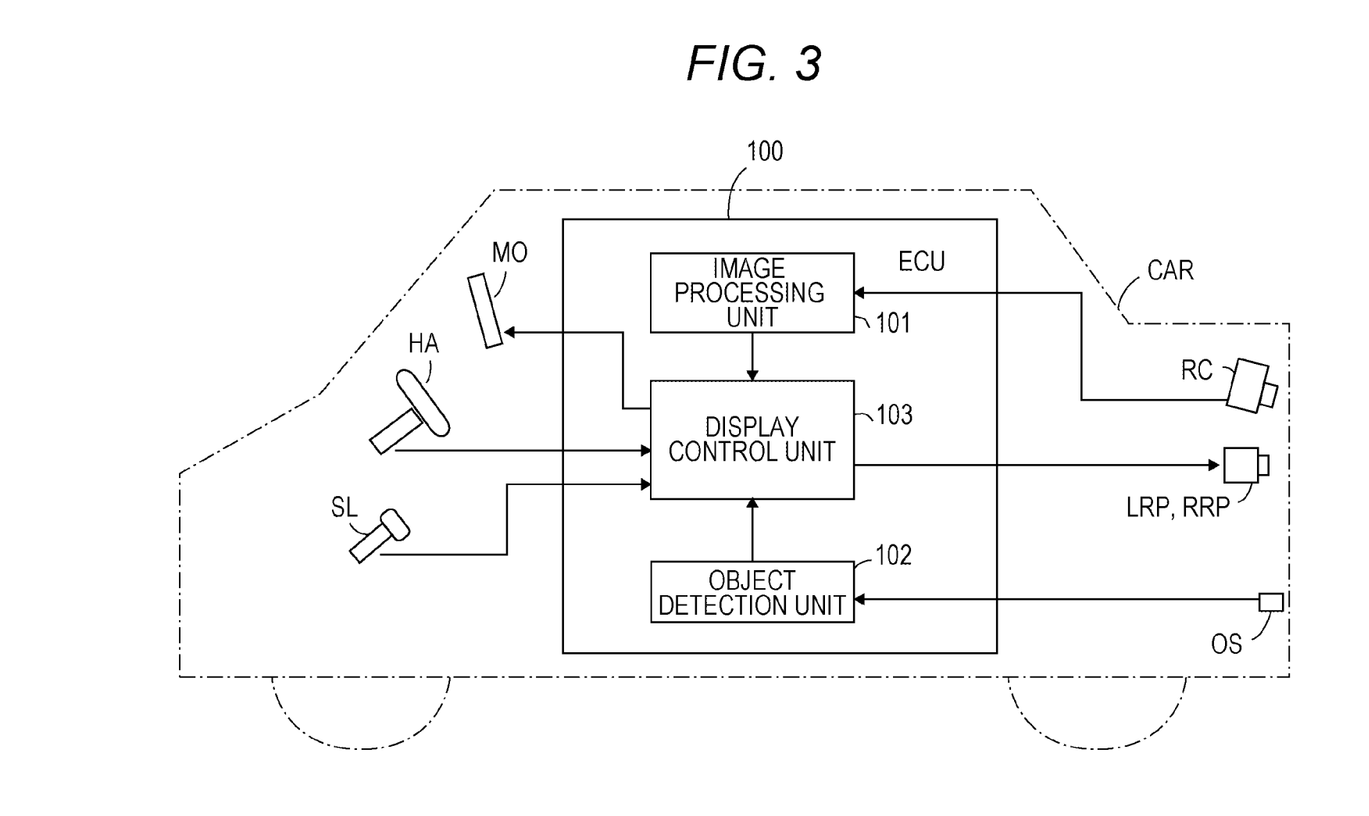
FIG. 3 is a block configuration diagram of the display device of the first embodiment.

FIG. 3 is a block configuration diagram of the display device, and elements corresponding to those illustrated in FIG. 1 are denoted by the same reference numerals. The ECU 100 includes an image processing unit 101, an object detection unit 102, and a display control unit 103. The image processing unit 101 performs signal processing on an imaging signal captured by the rear camera RC, and outputs an image signal. The object detection unit 102 outputs a detection signal to the display control unit 103 when an object is detected by the object sensor OS. The display control unit 103 displays the image signal from the image processing unit 101 on the monitor MO, and controls projection of the notification pattern CP by the left and right rear projectors LRP, RRP based on input driving information and the detection signal from the object sensor OS.

Figure 4:
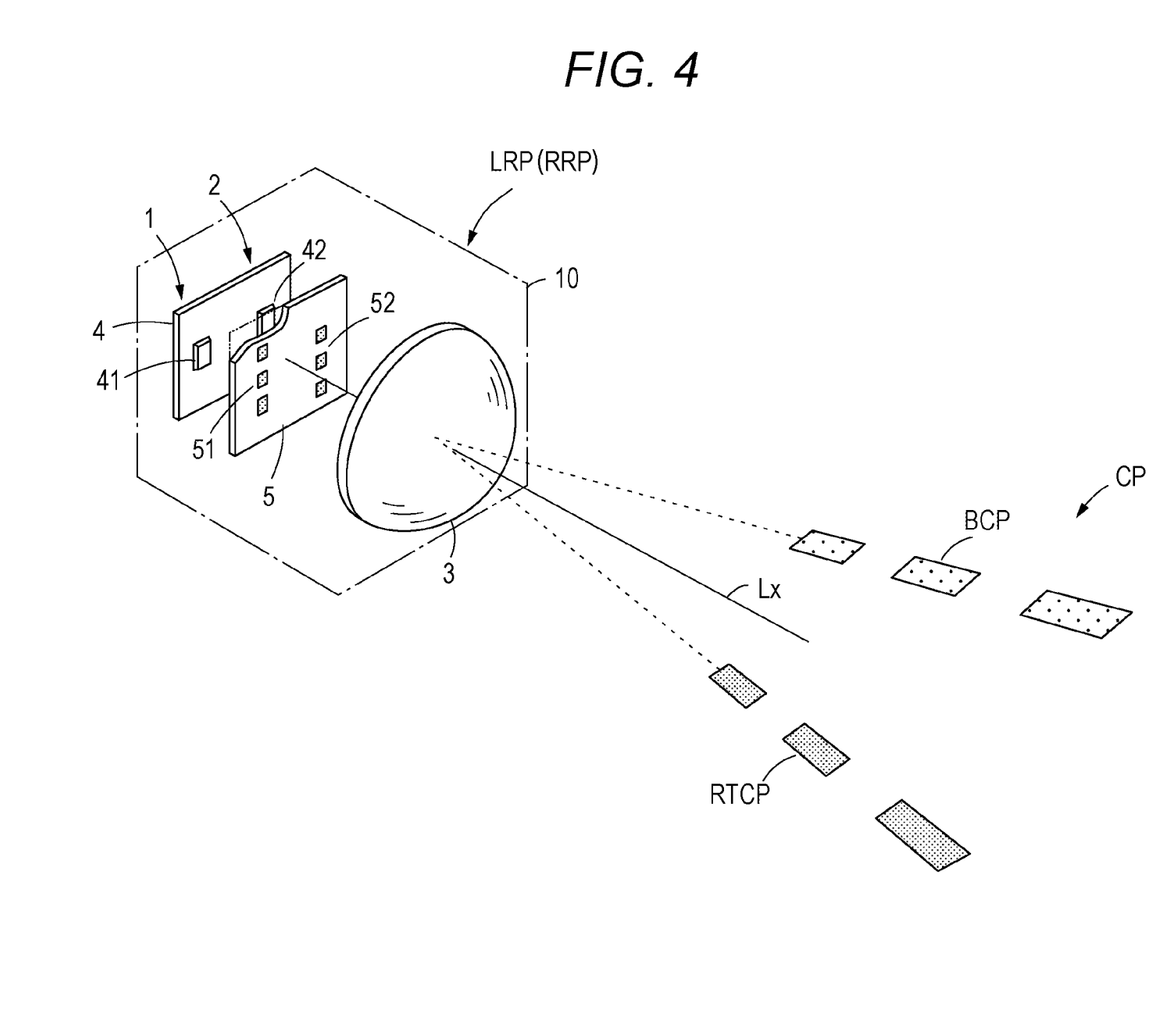
FIG. 4 is a schematic configuration view of a left rear projector of the first embodiment.

FIG. 4 is a schematic configuration view of the left rear projector LRP as the first projection device. Two light source units 1, 2 and one projection lens 3 are incorporated in a casing 10. The projection lens 3 is formed of a plano-convex lens having a flat surface on a light incident side and a convex surface on a light emission side, and an optical axis Lx of the projection lens 3 faces substantially directly behind the automobile. The two light source units 1, 2 include two light sources 41, 42 mounted on one light source board 4 and two pattern masks 51, 52 formed on one non-transparent mask plate 5. The light source unit 1 includes the light source 41 and the pattern mask 51, and the light source unit 2 includes the light source 42 and the pattern mask 52. These light source units 1, 2 are arranged on the left and right sides in the vehicle width direction with respect to the optical axis Lx of the projection lens 3. The light source unit 1 on the left side in FIG. 4 is configured as a back light source unit that projects a back notification pattern BCP as a first notification pattern, and the light source unit 2 on the right side in FIG. 4 is configured as a rear turn light source unit that projects a rear turn notification pattern RTCP as a second notification pattern.

The light source 41 of the back light source unit 1 includes a white LED that emits white light, and the light source 42 of the rear turn light source unit 2 includes an amber LED that emits amber light. The pattern mask 51, 52 of each of the light source units 1, 2 is configured as three rectangular transparent windows arranged at predetermined intervals in the up-down direction in the non-transparent mask plate 5. The positions of the transparent windows 51, 52 in the up-down direction are shifted by a required dimension between the back light source unit 1 and the rear turn light source unit 2. For example, a milky white plate that diffuses and transmits light may be arranged in each of the transparent windows 51, 52.

Figure 5:
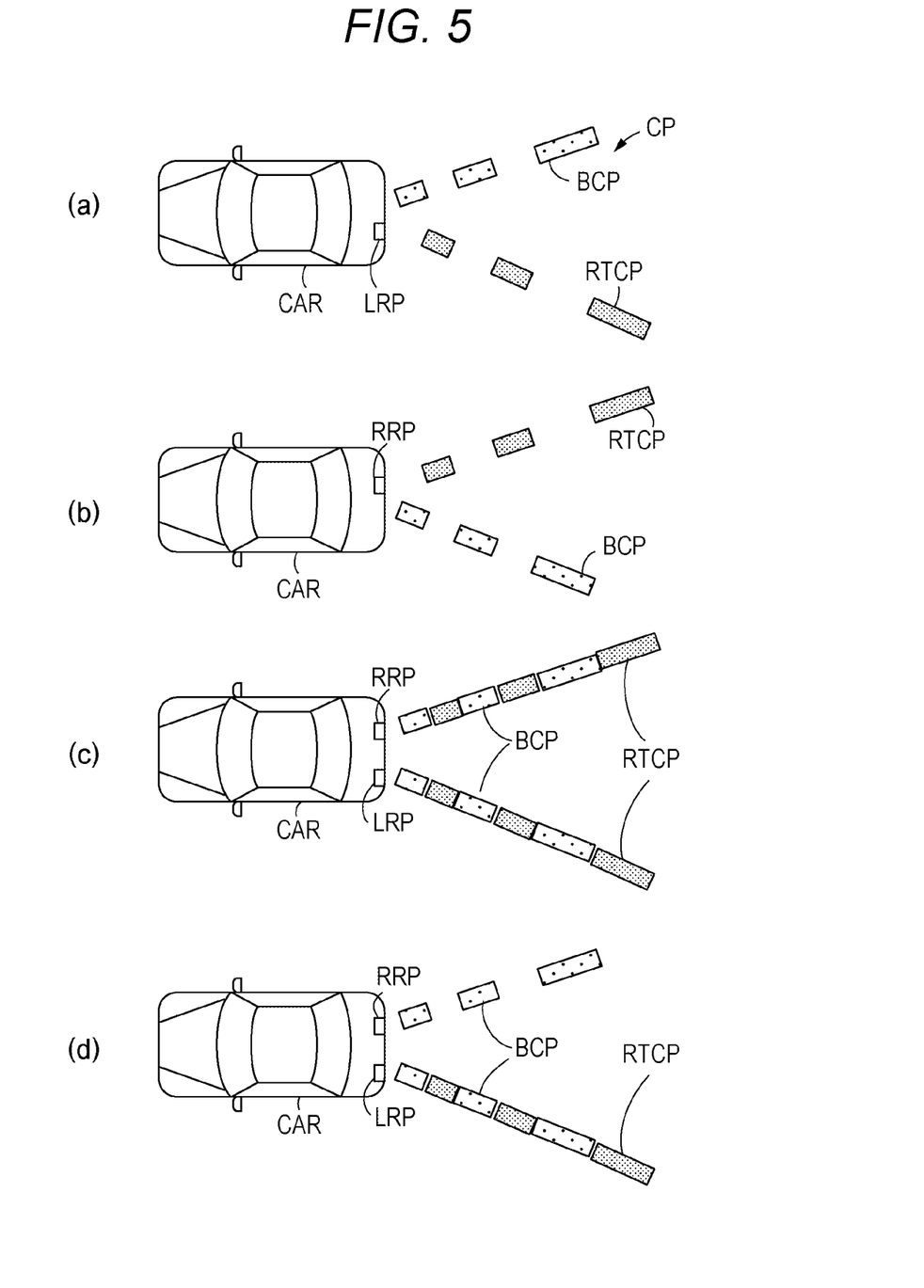
FIG. 5 is a conceptual view of a notification pattern by left and right rear projectors.

FIG. 5(*a*) is a plan view of the notification pattern CP projected by the left rear projector LRP. When the white LED 41 of the back light source unit 1 emits light, a real image of the pattern mask 51 is projected as a white back notification pattern BCP in the form of a broken line on the road surface in rear of the automobile CAR. The back notification pattern BCP is projected so as to extend diagonally backward to the right from the rear portion of the automobile CAR. When the amber LED 42 of the rear turn light source unit 2 emits light, a real image of the pattern mask 52 is projected as an amber rear turn notification pattern RTCP in the form of a broken line on the road surface in rear of the automobile CAR. The rear turn notification pattern RTCP is projected so as to extend diagonally backward to the left from the rear portion of the automobile CAR.

Since the right rear projector RRP as the second projection device has a configuration bilaterally symmetrical to the left rear projector LRP, illustration of the right rear projector RRP is omitted. FIG. 5(*b*) is a plan view of the notification pattern projected by the right rear projector RRP, and the notification pattern is projected bilaterally symmetrically to the notification pattern projected by the left rear projector LRP. That is, when the white LED 41 of the back light source unit 1 emits light, the back notification pattern BCP extending diagonally backward to the left from the rear portion of the automobile CAR is projected. When the amber LED 42 of the rear turn light source unit 2 emits light, the rear turn notification pattern RTCP extending diagonally backward to the right from the rear portion of the automobile CAR is projected.

Thus, when the left and right rear projectors LRP, RRP project the notification patterns at the same time, as illustrated in FIG. 5(*c*), one linear pattern extending such that the rear turn notification pattern RTCP from the left rear projector LRP and the back notification pattern BCP from the right rear projector RRP are alternately arranged diagonally backward to the right and one linear pattern extending such that the back notification pattern BCP from the left rear projector LRP and the rear turn notification pattern RTCP from the right rear projector RRP are alternately arranged diagonally backward to the left are projected in an inverted chevron shape.

As described above, the back notification pattern BCP and the rear turn notification pattern RTCP are projected by the left and right rear projectors LRP, RRP. At least part of these notification patterns BCP, RTCP is projected in the region Ac imaged by the rear camera RC as illustrated in FIG. 2, and therefore, part of these notification patterns BCP, RTCP is displayed on the monitor MO and can be visually recognized by the driver.

Operation of the display device having the above-described configuration will be described. When the driver operates the shift lever SL to move the automobile CAR backward, a backward movement signal is input to the ECU 100. The display control unit 103 controls the back light source units 1 of the left and right rear projectors LRP, RRP based on the backward movement signal, and projects the white back notification pattern BCP as the first notification pattern on the road surface in rear of the automobile. At this time, if the driver does not steer the steering wheel HA, the display control unit 103 controls the left and right rear projectors LRP, RRP based on a steering signal, and projects the amber rear turn notification pattern on the rear road surface in the backward movement direction of the automobile. As a result, as illustrated in FIG. 5(*c*), the inverted chevron-shaped rear turn notification pattern RTCP is projected so as to overlap with the back notification pattern BCP. Alternatively, although not illustrated, only the back notification patterns BCP of the left and right rear projectors LRP, RRP may be projected.

When the driver operates the steering wheel HA to steer the automobile CAR to the rear left or right at the time of backward movement of the automobile CAR, the display control unit 103 controls the left and right rear projectors LRP, RRP based on the steering signal. For example, when the automobile CAR is moved backward while being steered leftward, as illustrated in FIG. 5(*d*), the back notification patterns BCP are projected by the left and right rear projectors LRP, RRP, and the rear turn notification pattern RTCP is projected by the left rear projector LRP on the road surface diagonally on the rear left side of the automobile CAR so as to overlap with the back notification pattern BCP.

Although not illustrated, when the automobile CAR is moved backward while being steered rightward, the back notification patterns BCP are projected by the left and right rear projectors LRP, RRP, and the rear turn notification pattern RTCP is projected by the right rear projector RRP on the road surface diagonally on the rear right side of the automobile CAR. The rear turn notification pattern is projected with overlapping with the back notification pattern. Note that since the transparent windows of the pattern masks 51, 52 of the back light source unit 1 and the rear turn light source unit 2 are shifted in the up-down direction as described above, the back notification pattern BCP and the rear turn notification pattern RTCP are projected as the linear patterns alternately arranged in the extension direction.

When the back notification pattern BCP is projected in this manner, a third party on the rear side of the automobile CAR can recognize that the automobile CAR will move backward by visually recognizing the back notification pattern BCP. When the rear turn notification pattern RTCP is projected, the third party can recognize that the automobile CAR will move to the right or the left. This allows the third party to take action to avoid danger.

On the other hand, at least part of the projected back notification pattern BCP and at least part of the rear turn notification pattern RTCP are also projected on the imaging region Ac of the rear camera RC, and therefore, are captured by the rear camera RC. Thus, these notification patterns BCP, RTCP are displayed on the monitor MO. The driver can check the projected back notification pattern BCP and rear turn notification pattern RTCP when checking the region in rear of the automobile CAR by visually recognizing the monitor MO. As described above, both the third party and the driver visually recognize the back notification pattern BCP and the rear turn notification pattern RTCP, so that safety while the automobile CAR is traveling is ensured.

In a case where the third party is present in the imaging region Ac of the rear camera RC illustrated in FIG. 2, the driver can confirm the third party by the monitor MO. However, as illustrated in FIG. 2, in a case where the third party is outside the imaging region Ac, such as a case where a third party M1 is present on the outer right or left side of the imaging region Ac or a case where a third party M2 is in a crouching state, these third parties M1, M2 are not imaged by the rear camera RC, and it is difficult to confirm the third parties M1, M2 on the monitor MO. For this reason, the driver may erroneously recognize that there is no third party, which causes a problem in the safety while the automobile CAR is traveling.

Figure 6:
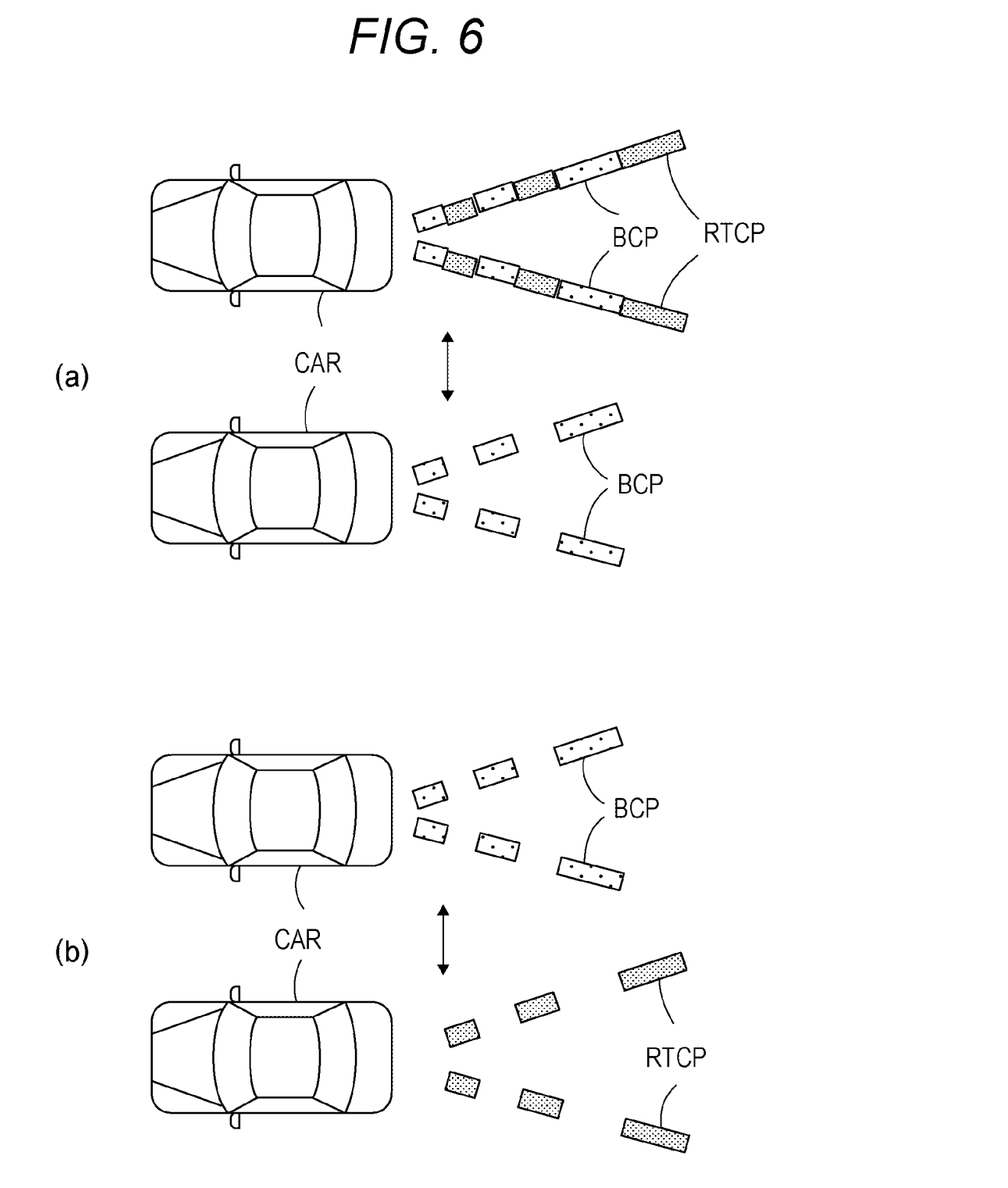
FIG. 6 is a conceptual view of a projection form of the notification pattern at the time of object detection.

In such a case, the object detection unit 102 of the ECU 100 detects the third parties M1, M2 based on the detection signal from the object sensor OS. Then, the display control unit 103 controls the left and right rear projectors LRP, RRP based on the detection signal. For example, as illustrated in the lower view of FIG. 6(a), the back notification pattern BCP is projected as usual (in a continuous lighting state), while the rear turn notification pattern RTCP is projected in a blinking state as illustrated in the upper view. That is, the notification patterns in the upper and lower views are alternately projected. Thus, when the third party recognizes blinking of the rear turn notification pattern RTCP, it can be assumed that the third party is not displayed on the monitor MO and the driver of the automobile may not recognize the third party. This allows the third party to quickly take action to ensure one's safety. On the other hand, the driver can recognize that there is the third party not displayed on the monitor MO by checking blinking of the rear turn notification pattern RTCP on the monitor MO. As a result, the safety while the automobile is being traveled by the driver is ensured.

Instead of blinking the rear turn notification pattern RTCP, the back notification pattern BCP and the rear turn notification pattern RTCP may be alternately projected in a blinking state as illustrated in the upper and lower views of FIG. 6(b). Further, although not illustrated, the light emission amounts of the white LED and the amber LED as the light sources may be changed over time instead of blinking. In either case, as described above, both the third party and the driver can take action to ensure the safety while the automobile is traveling.

Modification of First Embodiment

Figure 7:
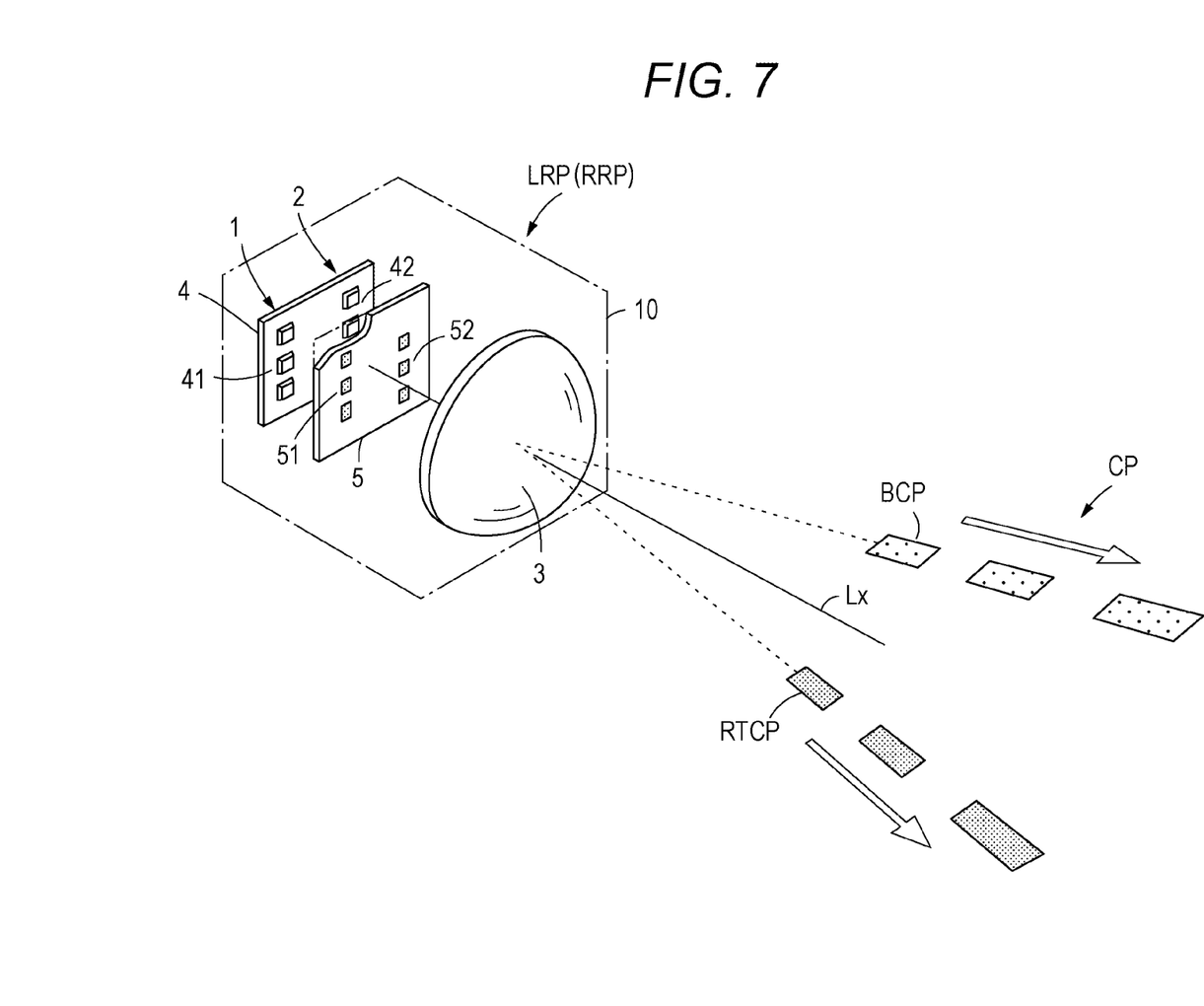
FIG. 7 is a schematic configuration view of a left rear projector of a modification of the first embodiment.

FIG. 7 is a schematic configuration view of a left rear projector according to a modification of the first embodiment. Since a basic configuration of the first modification is the same as the basic configuration of the first embodiment, equivalent elements are denoted by the same reference numerals. A right rear projector is bilaterally symmetrical to the left rear projector. In this modification, a plurality of white and amber LEDs corresponding to the number of transparent windows of the pattern mask 51, 52 are arranged as the light source 41, 42 in each of the back light source unit 1 and the rear turn light source unit 2, and light of each LED is emitted through the corresponding transparent window. Thus, by causing the plurality of LEDs 41 or the plurality of LEDs 42 to emit light in series, the back notification pattern BCP and the rear turn notification pattern RTCP each having the linear pattern shape can be projected in series along the length direction, and can be projected so-called sequentially.

Consequently, in the case of the forms of the first embodiment illustrated in FIGS. 6(a) and 6(b), i.e., when the object sensor OS detects the third party, at least one of the back notification pattern BCP or the rear turn notification pattern RTCP is sequentially projected so that the third party can reliably recognize backward movement of the automobile and the backward movement direction of the automobile. In addition, the driver can reliably recognize the presence of the third party by visually recognizing such a sequentially-projected notification pattern on the monitor MO.

Second Embodiment

Figure 8:
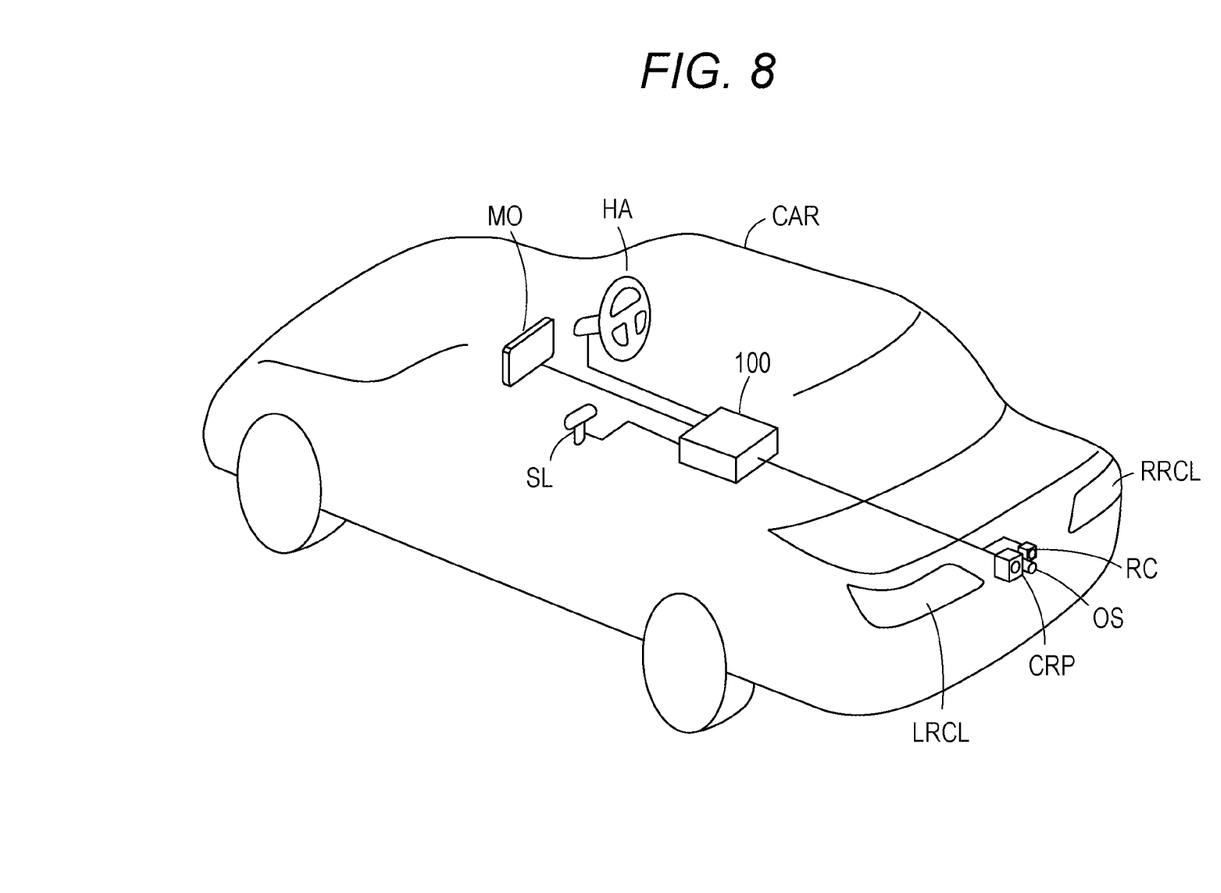
FIG. 8 is a schematic perspective view of an automobile equipped with a display device of a second embodiment.

FIG. 8 is a schematic perspective view of an automobile CAR equipped with a rear projector of a second embodiment. Elements equivalent to those in the first embodiment are denoted by the same reference numerals. In the second embodiment, no rear projectors are arranged in left and right rear combination lamps LRCL, RRCL of a vehicle body rear portion of an automobile, and one composite rear projector CRP is arranged between the left and right rear combination lamps LRCL, RRCL. The composite rear projector CRP is configured integrally with a rear camera RC and an object sensor OS, and is mounted on a vehicle body of the automobile CAR.

Figure 9:
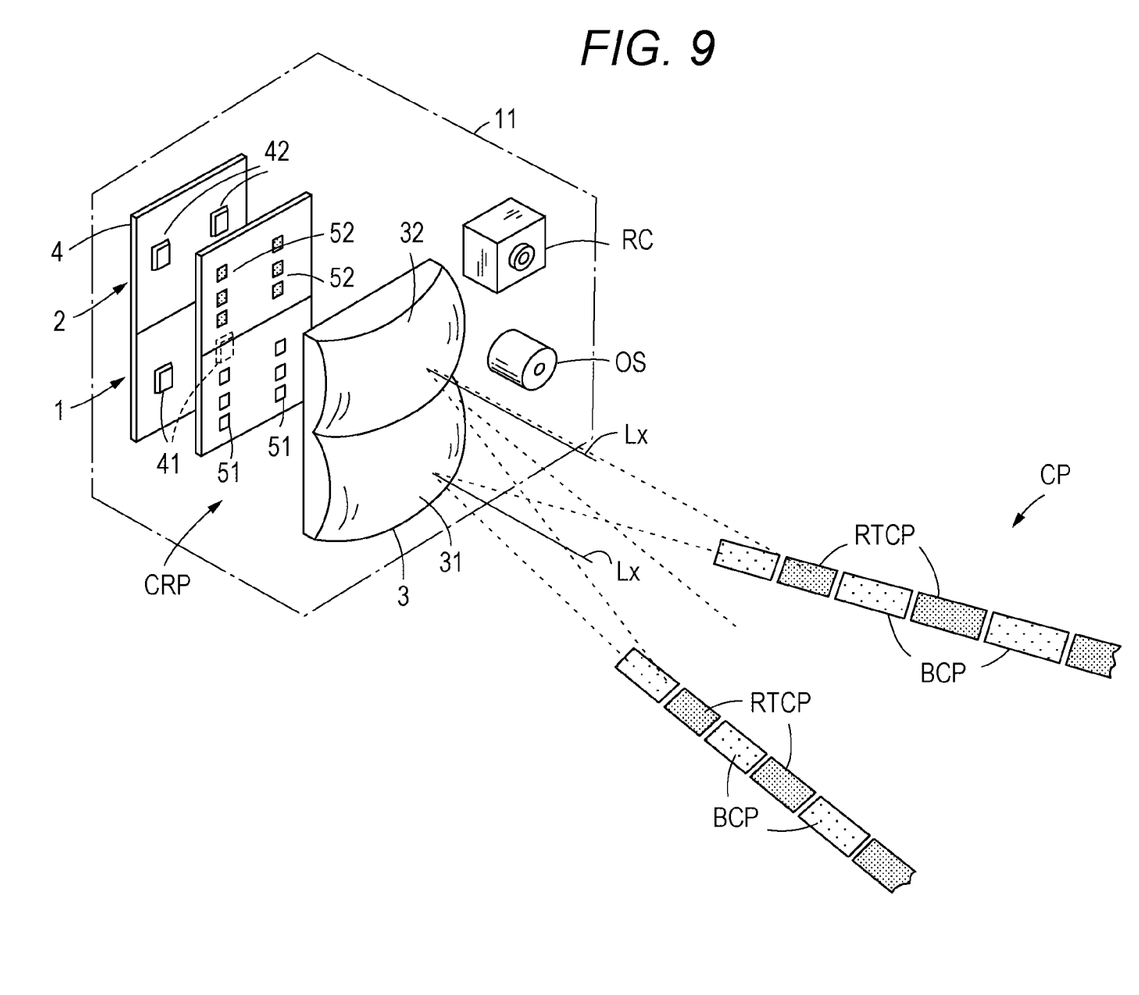
FIG. 9 is a schematic configuration view of a composite rear projector of the second embodiment.

FIG. 9 is a conceptual configuration view including the composite rear projector CRP, and the composite rear projector CRP, the rear camera RC, and the object sensor OS are installed in a casing 11. The composite rear projector CRP includes one projection lens 3 and two light source units 1, 2. The two light source units 1, 2 are arranged one above the other, and the lower light source unit 1 is configured as a back light source unit that projects a back notification pattern BCP. The upper light source unit 2 is configured as a rear turn light source unit that projects a rear turn notification pattern RTCP. The back light source unit 1 includes white LEDs 41 and pattern masks 51 as a first projection device, and the rear turn light source unit 2 includes amber LEDs 42 and pattern masks 52 as a second projection device.

The projection lens 3 is a free curved surface lens configured such that two lens portions 31, 32 are arranged one above the other and integrally formed. The upper and lower lens portions 31, 32 are configured as independent projection lenses. The white LEDs 41 and the pattern masks 51 of the back light source unit 1 are arranged on the left and right sides with respect to an optical axis Lx of the lower lens portion 31, and from the pattern masks 51, a white back notification pattern BCP as a first notification pattern having an inverted chevron shape is projected by the lower lens portion 31. In addition, the amber LEDs 42 and the pattern masks 52 of the rear turn light source unit 2 are arranged on the left and right sides with respect to the optical axis Lx of the upper lens portion 32, and from the pattern mask 52, an amber rear turn notification pattern RTCP as a second notification pattern having an inverted chevron shape is projected by the upper lens portion 32.

In the second embodiment, the notification pattern projected by the composite rear projector CRP is basically the same as that in the first embodiment. That is, when the object sensor OS detects no object at the time of backward movement of the automobile CAR, as illustrated in FIG. 5(c), the white LEDs 41 of the back light source unit 1 emit light to project the back notification pattern BCP, and the amber LEDs 42 of the rear turn light source unit 2 emit light to project the rear turn notification pattern RTCP. Alternatively, only the back notification pattern BCP may be projected. As illustrated in FIG. 5(d), the amber LEDs 42 of the rear turn light source unit 2 selectively emit light according to the direction in which the automobile moves backward, so that the rear turn notification pattern RTCP is projected.

When the object sensor OS detects an object, either or both of the back notification pattern BCP and the rear turn notification pattern RTCP blink as in FIGS. 6(a) and 6(b). Thus, as in the first embodiment, a third party can reliably recognize that the automobile will move backward. In addition, a driver can recognize the presence of the third party by visually recognizing these notification patterns BCP, RTCP on the monitor MO.

Third Embodiment

Figure 10:
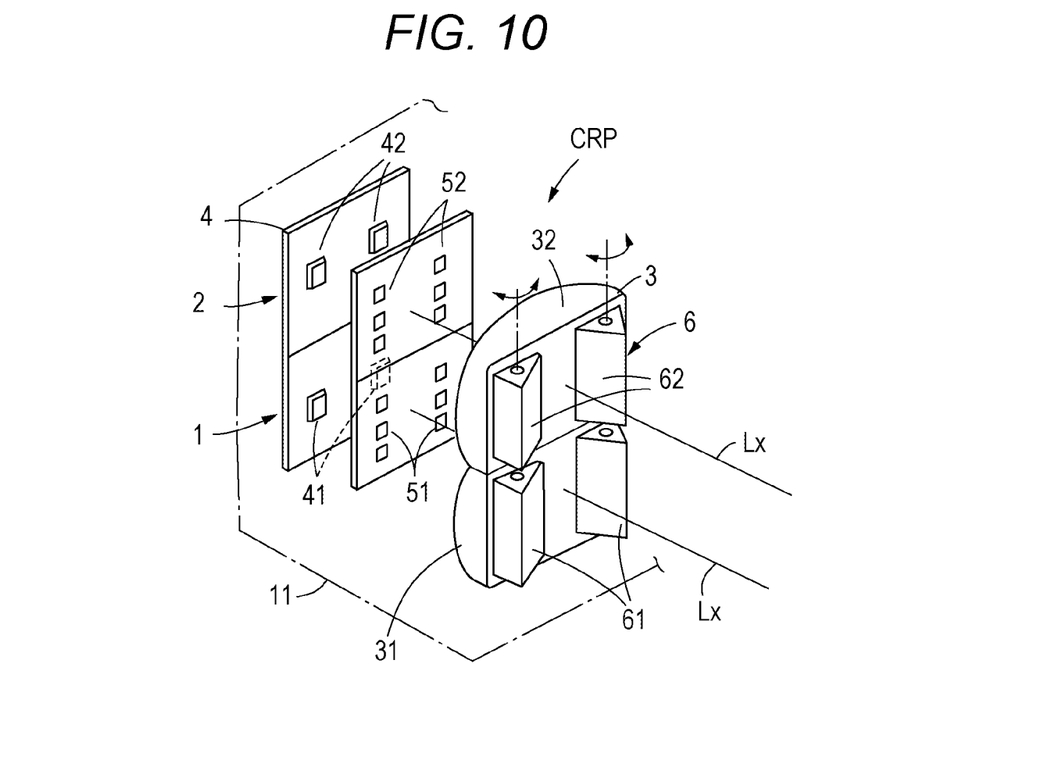
FIG. 10 is a schematic configuration view of a composite rear projector of a third embodiment.
Figure 11:
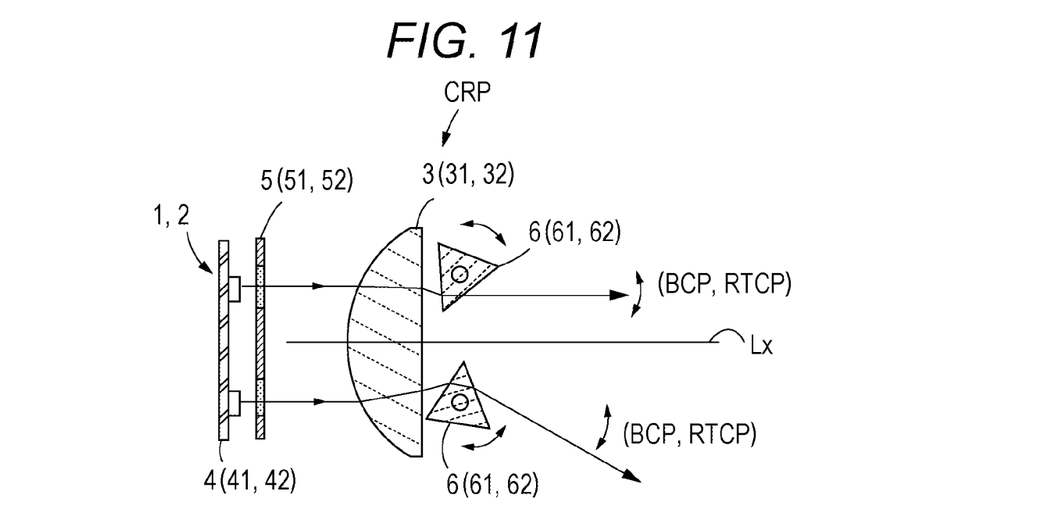
FIG. 11 is a schematic view of an optical path of the composite rear projector of the third embodiment.

FIG. 10 is a schematic configuration view of a rear projector of a third embodiment, and FIG. 11 is a schematic view of an optical path in a planar direction for describing the outline of the optical path. A basic configuration of the rear projector of the third embodiment is the same as the basic configuration of the second embodiment, and the rear projector of the third embodiment is configured as a composite rear projector CRP including a projection lens 3 including one free curved surface lens and two light source units 1, 2 for projecting a back notification pattern and a rear turn notification pattern. In the configuration different from the configuration of the second embodiment, each of lower and upper lens portions 31, 32 of the projection lens 3 is configured such that the light incident side of each of the lens portions 31, 32 is a convex free curved surface and the light emission side of each of the lens portions 31, 32 is a flat surface. Pairs of movable prisms 6 arranged on the left and right sides with respect to an optical axis Lx are arranged on the light emission side of the lens portions 31, 32.

The movable prisms 6 include lower movable prisms 61 arranged so as to face the lower lens portion 31 and upper movable prisms 62 arranged so as to face the upper lens portion 32. The movable prism 6 (61, 62) has a wedge-shaped planar shape, here, a triangular shape, and is turned horizontally in the left-right direction by an actuator (not illustrated) such as an electromagnetic actuator, so that an angle with respect to the light emission surface of each of the lens portions 31, 32, i.e., an angle with respect to the optical axis Lx, can be changed.

In the third embodiment, as in the second embodiment, the back notification pattern BCP is projected by the back light source unit 1, and the rear turn notification pattern RTCP is projected by the rear turn light source unit 2. At this time, as illustrated in FIG. 11, light emitted from each of the light source units 1, 2 and focused by the projection lens 3 is refracted by each of the movable prisms 61, 62. Thus, the direction of emission of light from the projection lens 3 is changed by controlling the actuator in a display control unit 103 of an ECU 100 to adjust the angles of the movable prisms 61, 62. That is, by changing the angles of the movable prisms 61, 62, light of the light source units 1, 2 emitted from the light emission surface of the projection lens 3 is deflected in the left-right direction, and the direction of projection of the notification patterns BCP, RTCP can be changed.

Figure 12:
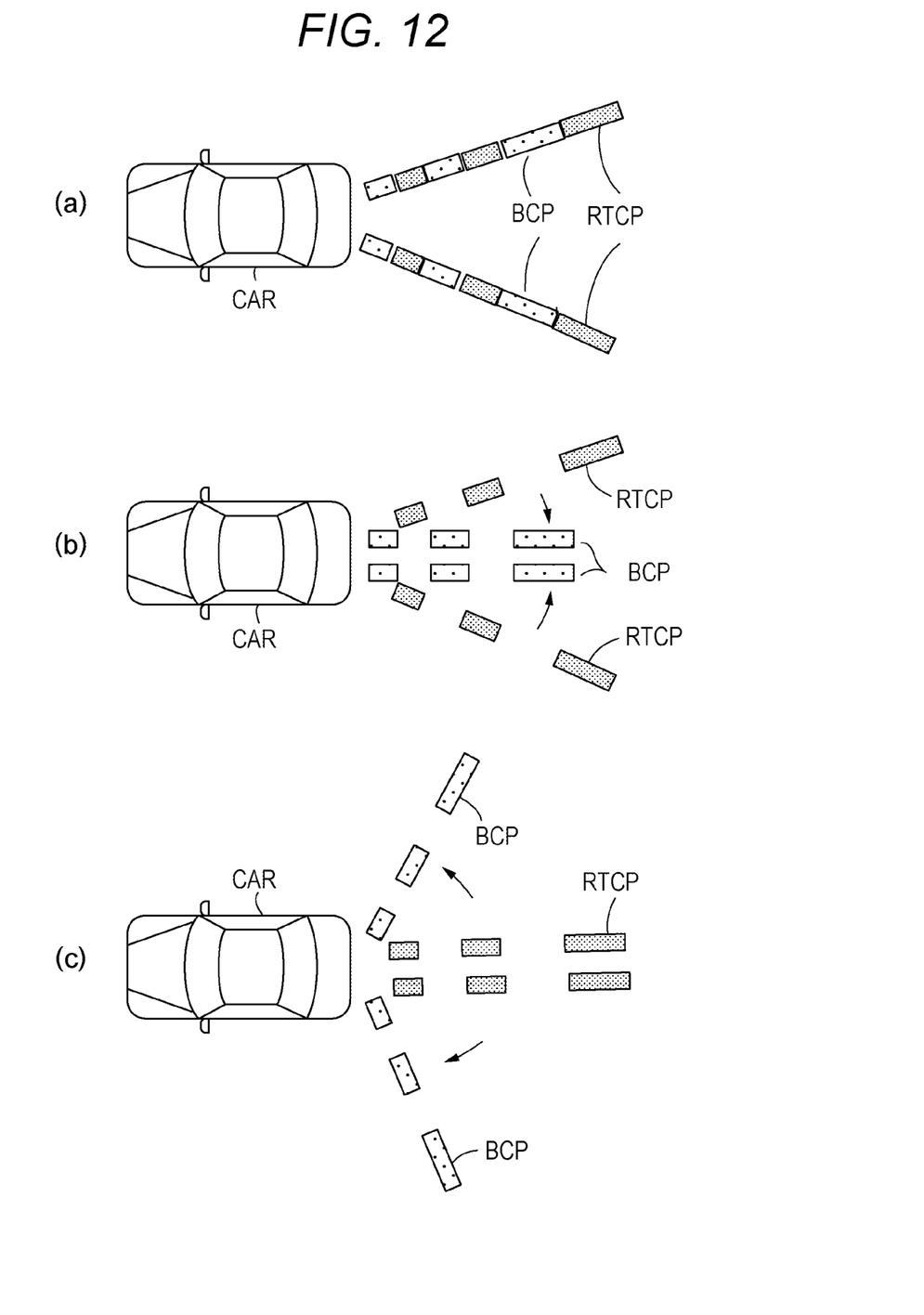
FIG. 12 is a conceptual view of a notification pattern by the composite rear projector of the third embodiment.

According to the third embodiment, by controlling the angles of the left and right lower movable prisms 61 with respect to projection of the notification patterns BCP, RTCP in a steady state illustrated in FIG. 12(a), two left and right back notification patterns BCP can be projected in a direction parallel to the front-rear direction of an automobile CAR as illustrated in FIG. 12(b). Alternatively, as illustrated in FIG. 12(c), the back notification patterns BCP can be projected in a state of being opened left and right with a great angle. In addition, although not illustrated, by changing the angles of the left and right upper movable prisms 62, the opening angle of the inverted chevron shape of the rear turn notification pattern RTCP can be changed.

Figure 13:
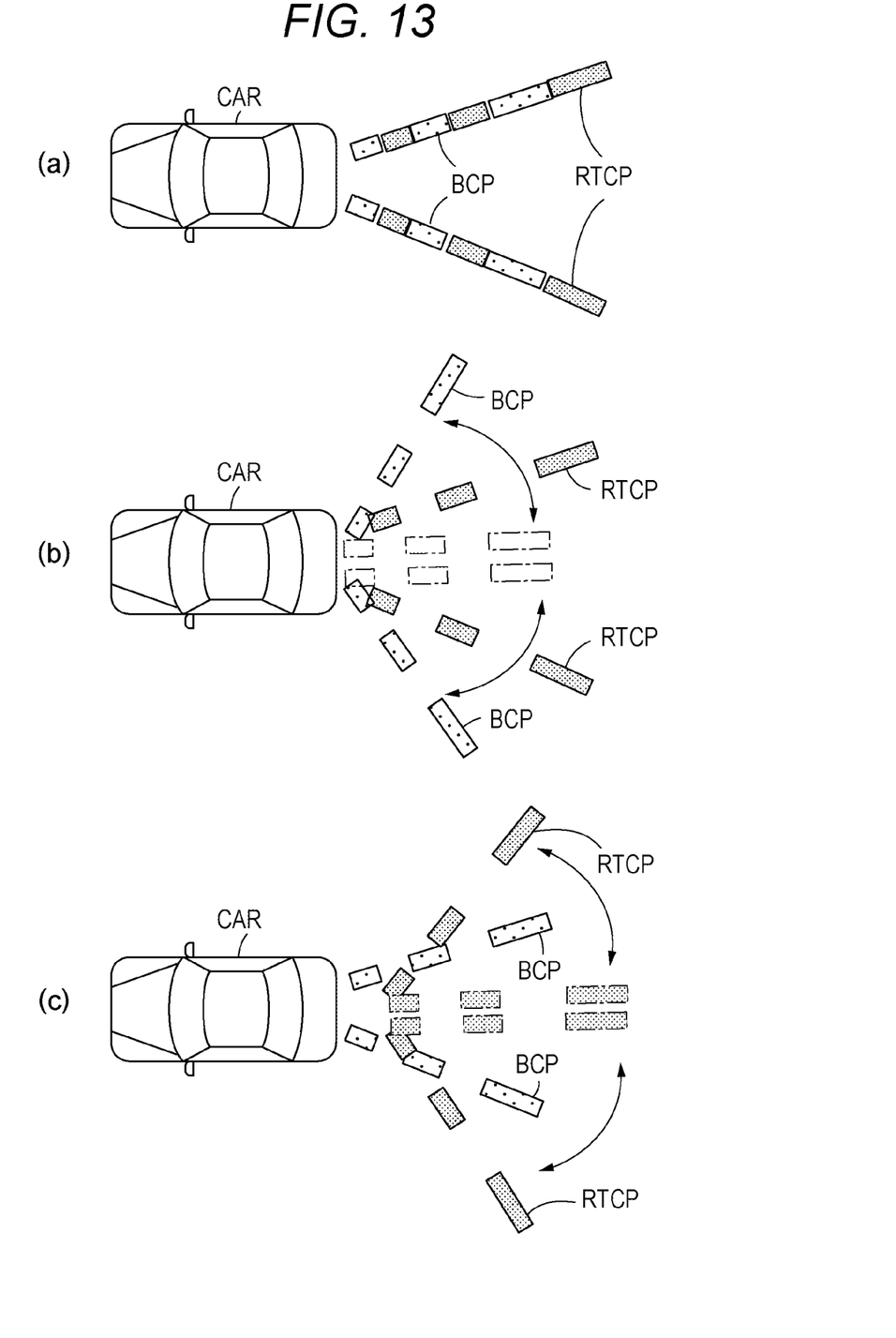
FIG. 13 is a conceptual view of the notification pattern by the composite rear projector of the third embodiment.

On the other hand, when a third party is detected by an object sensor OS, the projection angle of the back notification pattern BCP is continuously changed and the back notification pattern BCP is swivel-projected in such a manner that the angles of the lower movable prisms 61 are continuously changed over time with respect to the notification patterns BCP, RTCP in a steady state of FIG. 13(a), for example, as in FIG. 13(b). Alternatively, as in FIG. 13(c), by continuously changing the angles of the upper movable prisms 62 over time, the projection angle of the rear turn notification pattern RTCP is changed and the rear turn notification pattern RTCP is swivel-projected. The third party can reliably recognize that the automobile will move backward by swivel projection of the notification patterns BCP, RTCP. In addition, a driver can recognize the presence of the third party by visually recognizing the swivel-projection state of these notification patterns BCP, RTCP on the monitor MO. Also in the third embodiment, the notification pattern may blink. Alternatively, the notification pattern may be sequentially projected by providing a plurality of light sources as in the modification of the first embodiment.

In each of the above-described embodiments, the example where the first notification pattern and the second notification pattern are the back notification pattern and the rear turn notification pattern has been described, but the present invention is not limited to these notification patterns. In addition, the projection direction of each notification pattern is not limited to the rear of the vehicle, and the present invention can also be applied to a case where a notification pattern is projected in a lateral direction which is likely to be a blind area of a vehicle. In the present invention, the projection form of each notification pattern, particularly the pattern shape and color of the notification pattern, and the projection form of the notification pattern when an object is detected are not limited to those in the embodiments.

The present international application claims priority based on Japanese Patent Application No. 2021-126366 filed on Aug. 2, 2021, and the entire contents of Japanese Patent Application No. 2021-126366, which is Japanese Patent Application of the present international application, are incorporated in the present international application by reference.

The above description of the specific embodiments of the present invention has been presented for the purpose of illustration. The embodiments are not intended to be exhaustive or to limit the invention as it is in the form described. It is obvious to those skilled in the art that many modifications and alterations are possible in light of the contents of the description above.

LIST OF REFERENCE SIGNS

1 Back Light Source Unit (First Projection Device)
2 Rear Turn Light Source Unit (Second Projection Device)
3 (31, 32) Projection Lens
4 (41, 42) Light Source (LED)
5 (51, 52) Pattern Mask
6 (61, 62) Movable Prism
10, 11 Casing
100 ECU
101 Information Processing Unit
102 Object Detection Unit (Object Detection Device)
103 Display Control Unit
RP Rear Projector (Projection Device)
CRP Composite Rear Projector (Projection Device)
RC Rear Camera (Imaging Device)
OS Object Sensor (Object Detection Device)
BCP Back Notification Pattern (First Notification Pattern)

RTCP Rear Turn Notification Pattern (Second Notification Pattern)
MO Monitor
As Object Detection Region
Ac Imaging Region
M1, M2 Third Party (Object)

The invention claimed is:

1. A vehicle display device comprising:
a projection device that projects a notification pattern on a region in vicinity of a vehicle;
an imaging device that images an imaging region in the vicinity of the vehicle; and
an object detection device capable of detecting an object present in a detection region including at least a part of the imaging region and a region which cannot be imaged by the imaging device,
wherein when the object detection device detects the object in a region within the detection region but outside of the imaging region, the projection device projects the notification pattern in a form different from the notification pattern in a normal state.

2. The vehicle display device according to claim 1, wherein
the imaging device is capable of imaging a region including at least a region on which the notification pattern is projected, and
a captured image is displayed on a monitor visually checkable by an occupant of the vehicle.

3. The vehicle display device according to claim 1, wherein
the notification pattern includes a first notification pattern and a second notification pattern that correspond to different movement modes of the vehicle, and
at least one of a pattern shape or color is different between the first notification pattern and the second notification pattern.

4. The vehicle display device according to claim 3, wherein at least one of the first notification pattern or the second notification pattern is projected in a blinking state when the object detection device detects the object.

5. The vehicle display device according to claim 3, wherein a projection position or a projection direction of at least one of the first notification pattern and the second notification pattern is changed when the object detection device detects the object.

6. The vehicle display device according to claim 3, wherein
the projection device includes a first projection device that projects the first notification pattern, and
a second projection device that projects the second notification pattern.

7. The vehicle display device according to claim 6, wherein the first projection device and the second projection device are installed in a lamp housing of the vehicle.

8. The vehicle display device according to claim 6, wherein the first projection device and the second projection device are installed in one casing.

9. The vehicle display device according to claim 6, wherein
the first projection device and the second projection device include
a first light source unit and a second light source unit, and
a projection lens that projects the first notification pattern and the second notification pattern by the light source units.

10. The vehicle display device according to claim 3, wherein
the first notification pattern is a back notification pattern projected when the vehicle moves backward, and
the second notification pattern is a rear turn notification pattern indicating a traveling direction of the vehicle.

11. A vehicle display device comprising:
a projection device configured to project a notification pattern on a region in vicinity of a vehicle;
an imaging device configured to image an imaging region in the vicinity of the vehicle, the imaging region including at least the region on which the notification pattern is projected;
an object detection device configured to detect an object present in a detection region including at least a part of the imaging region and a region which cannot be imaged by the imaging device and output a detection signal;
a monitor configured to display an image captured by the imaging device visually checkable by an occupant of the vehicle, the image including the notification pattern projected by the projection device; and
a display control unit that controls projection of the notification pattern by the projection device based on the detection signal,
wherein the display control unit is configured to determine whether the object detection device detects the object in a region within the detection region but outside of the imaging region, and control the projection device to project the notification pattern in a form different from the notification pattern in a normal state based on the detection signal indicating that the object detection device detects the object in the region within the detection region but outside of the imaging region.

* * * * *